Jan. 29, 1924.

R. B. FAGEOL

BUMPER FOR AUTOMOBILES

Filed Jan. 31, 1923

1,482,226

INVENTOR.
ROLLIE B. FAGEOL
BY
ATTORNEYS.

Patented Jan. 29, 1924.

1,482,226

UNITED STATES PATENT OFFICE.

ROLLIE B. FAGEOL, OF OAKLAND, CALIFORNIA, ASSIGNOR TO AMERICAN CHAIN COMPANY, INC., OF BRIDGEPORT, CONNECTICUT, A CORPORATION OF NEW YORK.

BUMPER FOR AUTOMOBILES.

Application filed January 31, 1923. Serial No. 616,073.

*To all whom it may concern:*

Be it known that I, ROLLIE B. FAGEOL, a citizen of the United States, residing at Oakland, county of Alameda, and State of California, have invented new and useful Improvements in Bumpers for Automobiles, of which the following is a specification.

This invention relates to a bumper for automobiles, and particularly pertains to a bumper of the spring bar loop end type.

It is the principal object of the present invention to provide a bumper having an impact structure to extend across the front of a vehicle frame, said structure terminating in looped resilient ends which are bent back upon the impact structure and then extend rearwardly to provide connecting means for mounting the bumper on the frame of a vehicle, the impact structure being formed by continuations of the resilient looped ends and by an intermediate plate of substantially rigid formation, which plate serves the double purpose of a name plate and an increased impact area for the center of the bumper.

The invention is illustrated by way of example in the accompanying drawings, in which.

Figure 1:
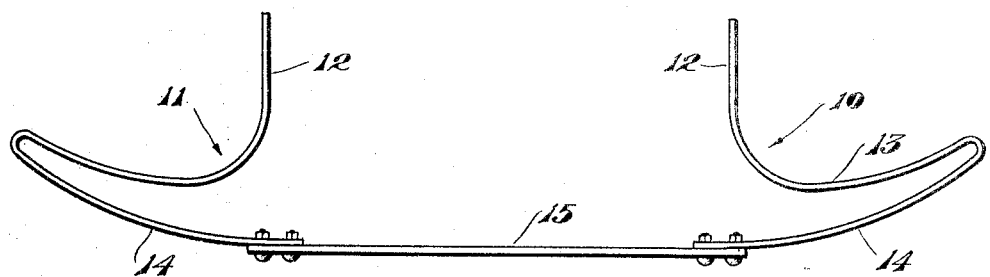
Fig. 1 is a view in plan showing a bumper embodying the present invention.
Figure 2:
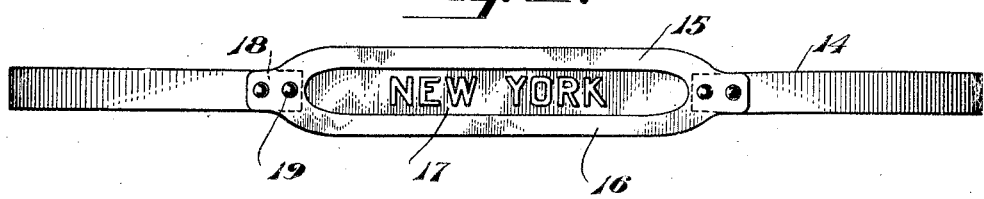
Fig. 2 is a view in front elevation showing the bumper.
Figure 3:
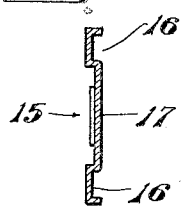
Fig. 3 is a view in transverse section through the central impact plate.

Referring more particularly to the drawing, 10 and 11 indicate bumper horns which are formed of flat strips of resilient material, such as spring steel. These horns constitute rearwardly extending portions 12 by which the bumper may be secured to a vehicle frame, outwardly extending portions 13 forming the back of a horn loop, and inwardly extending lengths 14 which are bent upon the portions 13 to form parts of the impact bar of the bumper. The lengths 14 of the two horns extend toward each other and lie in the same horizontal plane. Their adjacent ends terminate some distance from each other, however, and the impact bar is completed by an intermediate plate 15 which bridges the gap between the ends of the horn portions 14. As shown in Fig. 2, this impact plate is of greater width than the width of the material from which the resilient horns are made and is of a length substantially agreeing with the width of the vehicle frame. The increased impact member is here shown in Fig. 3 as being formed of pressed metal and comprising parallel channel shaped portions 16 connected by an intermediate web 17. This web serves the useful functions of strengthening the plate and providing a supporting back-ground for any indicia which the owner of the car might wish to display, as for example, it is now the vogue to display the name of the town or city of which the car owner is a resident, and this may be conveniently displayed on a bumper by forming the plate 15 with embossed letters on the web portion 17, as, for example, the words "New York" shown in Fig. 2 of the drawing.

The channel shaped members 16 of the plate unite at their opposite ends to form a substantially oval channel frame around the complete margin of the plate and circumscribing the indicia. The adjacent ends of the portions 14 of the bumper horns may be provided with attaching lugs or ears 18, as shown in Fig. 2. These ears will receive bolts or rivets 19 which pass through the frame structure of the plate 15 and are secured through the ears. By this means the various elements of the bumper may be securely fastened together.

It will thus be seen that by the invention here disclosed it is possible to obtain a bumper of the loop end spring bar type having an increased impact area in the center thereof for additional protection to the vehicle and at the same time providing suitable means for displaying any desired indicia on the bumper.

Having thus described my invention, what I claim and desire to secure by Letters Patent is:

1. A bumper for automobiles comprising a pair of flat resilient loop end horns having forward portions terminating in the same horizontal plane, the ends of said portions being spaced apart a distance substantially equal to a car frame upon which the bumper is mounted, and an increased impact area plate interposed between and connecting the forward terminating ends of said horns, said plate being pressed from a single piece of metal to form a substantially elliptical frame of channel section, the inner edges of said frame sections being integrally united by a web.

2. A bumper for automobiles comprising a pair of resilient loop end horns, each having rearwardly extending parts for connecting with the side rails of an automobile frame, and forward portions lying substantially in the same horizontal plane with their ends spaced from each other a distance substantially equal to the width between the frame members of the automobile and an increased impact area member of greater vertical width than the vertical width of the strips from which the horns are made, said impact member being rigidly secured to the forward ends of the horns and being formed in a single pressed plate having a central web portion surrounded by a frame of channel section and substantially of elliptical formation.

ROLLIE B. FAGEOL.